| [19] United States Patent | [11] Patent Number: 4,681,273 |
|---|---|
| Futagawa | [45] Date of Patent: Jul. 21, 1987 |

[54] APPARATUS FOR DRIVING TAPES

[76] Inventor: Toshinobu Futagawa, 3-3-23, Nishishinjuku, Shinjuku-ku, Tokyo, Japan

[21] Appl. No.: 700,310

[22] Filed: Feb. 11, 1985

[30] Foreign Application Priority Data

Feb. 16, 1984 [JP] Japan .................................. 59-27842
Feb. 16, 1984 [JP] Japan .................................. 59-27844

[51] Int. Cl.⁴ .......................... G11B 3/30; G11B 23/12
[52] U.S. Cl. ..................................... 242/55; 242/180; 360/91
[58] Field of Search ............... 242/55, 56.1, 180, 181, 242/68, 68.5; 360/91, 92

[56] References Cited

U.S. PATENT DOCUMENTS

| 3,140,360 | 7/1964 | Whitworth | 360/91 X |
| 3,664,603 | 5/1972 | Eskay | 242/180 |
| 4,160,169 | 7/1979 | Endicott, Jr. et al. | 250/S 70 |
| 4,198,007 | 4/1980 | Schoettle et al. | 242/68 X |

FOREIGN PATENT DOCUMENTS 100970 2/1984 European Pat. Off. .
27371 2/1984 Japan .

Primary Examiner—Stuart S. Levy
Assistant Examiner—David Werner
Attorney, Agent, or Firm—Louis Orenbuch; David Wolf; George Greenfield

[57] ABSTRACT

A tape driving apparatus is disclosed which is operable to shift all of tapes simultaneously so as to position items recorded on the tapes in a predetermined position or to record informations on the tapes. The tape driving apparatus includes a plurality of pairs of first and second rollers and associated tapes, the first and second rollers having a polygonal cross section, each tape being wound on the corresponding first roller from its one end with one face thereof inside and on the corresponding second roller from the other end thereof with the other face thereof inside.

4 Claims, 11 Drawing Figures

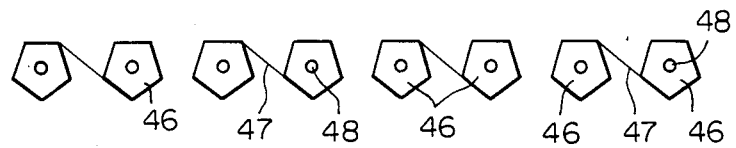
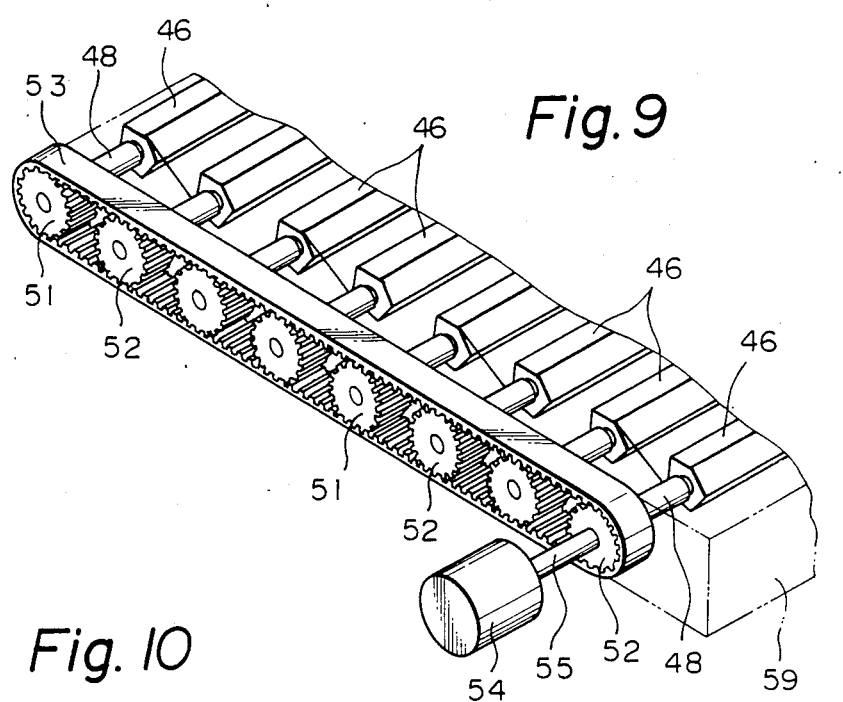
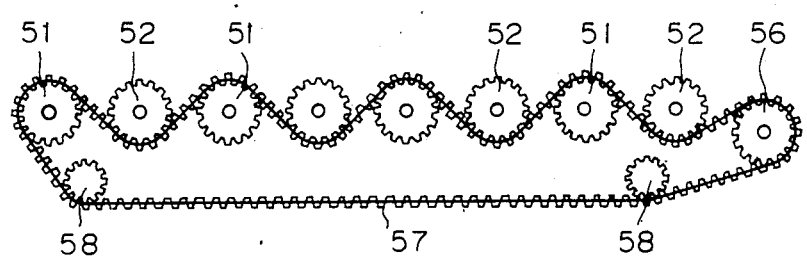

APPARATUS FOR DRIVING TAPES

BACKGROUND OF THE INVENTION

The present invention relates to an apparatus for positioning desired portions of tapes simultaneously in a predetermined position, and more particularly it relates to an improvement of tape holding means of the tape driving apparatus.

The present invention is particularly applicable to multi-purpose codeless input equipments for computer addressers, telephone itself and telephone exchangers, microfilm readers, magnetic recording systems or the like.

A conventional codeless input machine 4 (FIG. 1) comprises an input unit 1 and a film 2 on which a number of items 3 are recorded in matrix pattern. Each item recorded on the film corresponds to a respective information to be inputted. All of the items recorded on the film are grouped into a plurality of pages 5 having a lengthwise dimension B equal to that of the input unit, a transverse dimension of each page corresponding to the width of the film. In order to position a desired item 3 on the input unit 1 for inputting the information corresponding to the desired item, the film 2 can be moved by means of an appropriate film feeding device (not shown) incorporated into the input machine in both directions indicated by an arrow A such that the page 5 including the desired item 3 is aligned with the input unit 1. When the desired item 3 is energized by a pen-touch or key-push operation, a corresponding input signal is generated; said input signal selecting or designating a corresponding address among a plurality of addresses stored in a memory (not shown) through the medium of a control portion (not shown) in the input unit 1, thereby generating an output signal regarding the information corresponding to the desired item. When a new item to be inputted next is not included in the present page, the film must be moved to position a new page including said new item on the input unit 1.

In this conventional input machine, since the movement of the film is effected per "page", when the lengthwise dimension of the page B and the moving speed of the film is V, it takes at least a time of B/V fo changing a page from one to the next one. Particularly, if the first page is changed to the last page, when the total number of pages is N, it takes a long time of B/V (N−1). Accordingly, this conventional input machine has a disadvantage of time consumption for changing pages with the result that the efficiency of the inputting operation is reduced.

By increasing the moving speed of the film, the above drawback of the conventional input machine can be more or less eliminated. However, in this case, there exists another drawback that it is difficult to accurately stop a desired page of the film in a predetermined position on the input unit.

To eliminate the above drawbacks of the conventional codeless input machine, the applicant has proposed a new type of tape driving apparatuses, as described in the Japanese Patent Application No. 124877/82 and Japanese Patent Application No. 136538/82. The apparatus described in the Japanese Patent Application No. 124877/82 (referred to as "flat-type tape driving apparatus" hereinafter) comprises a plurality of first rollers arranged side by side in a single plane, a plurality of tapes each of which is wound from its one end on the corresponding first roller and which are wound together from the other ends thereof on a single second roller, and a plurality of guide plates each of which is arranged above the corresponding first roller and on which the tapes pass, the tapes being shifted simultaneously by the same amount by selectively driving the first rollers or the second roller. In the apparatus described in the Japanese Patent Application 136538/82 (referred to as "annular-type tape driving apparatus" hereinafter), the first rollers are arranged around the second roller and are disposed equidistantly from the second roller and from each other, the tapes being wound from their one ends on the corresponding first rollers and being also wound together from the other ends thereof on the second roller, the guide plates being arranged over the radially outermost portions of the first rollers.

Although these apparatuses bring about satisfactory results, due to the existence of the guide plates, the construction of the apparatus is relatively complex.

The applicant found that the tape driving apparatus can operate effectively without the guide plates by modifying the construction of the rollers and that the tapes can be more effectively utilized.

SUMMARY OF THE INVENTION

Therefore, an object of the present invention is to provide a tape driving apparatus which has a simple construction and which can position desired portions of the tapes simultaneously in a predetermined position.

In a preferred embodiment of the present invention, at least the first rollers of the tape driving apparatus has a polygonal cross section.

Another object of the present invention is to effectively utilize the tapes of the tape driving apparatus.

BRIEF DESCRIPTION OF THE DRAWINGS

FIG. 3 to FIG. 10 show effective utilization of the tapes in the tape driving apparatus, wherein FIG. 3 is a schematic side view of the annular-type tape driving apparatus according to a preferred embodiment of the present invention; FIG. 4 is a side view showing a pair of rollers holding the tape according to the principle of the invention; FIG. 5 is a side view of a cassette containing the paired rollers of FIG. 4; FIG. 6 is a modification of the paired rollers of FIG. 4; FIG. 7 is a version of the paired rollers of FIG. 6; FIG. 8 shows a preferred application of the paired rollers of FIG. 7; FIG. 9 is a partial perspective view showing an embodiment of means for driving the rollers of FIG. 8; and FIG. 9 is a side view showing another embodiment of the means for driving the rollers of FIG. 8.

DETAILED DESCRIPTION OF THE PREFERRED EMBODIMENTS

The present invention will now be described in detail with reference to the drawings showing embodiment of the tape driving apparatus according to the invention.

Figure 1:
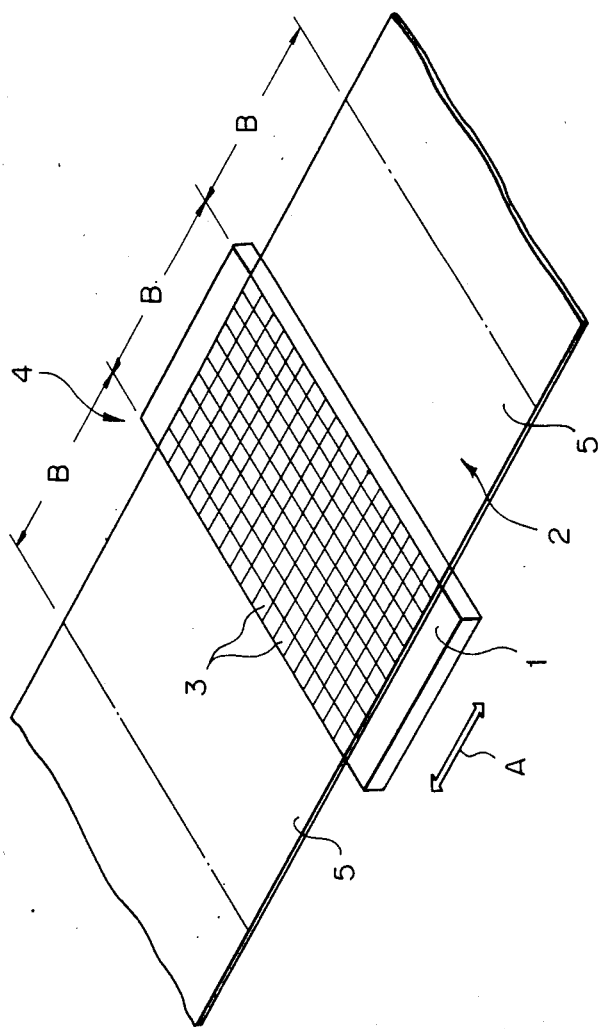
FIG. 1 is a partial perspective view of a conventional codeless input machine.
Figure 2A:
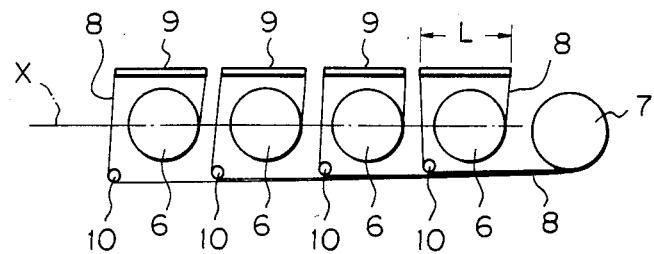
FIG. 2A is a side view showing a principle of the above flat-type tape driving apparatus.
Figure 2B:
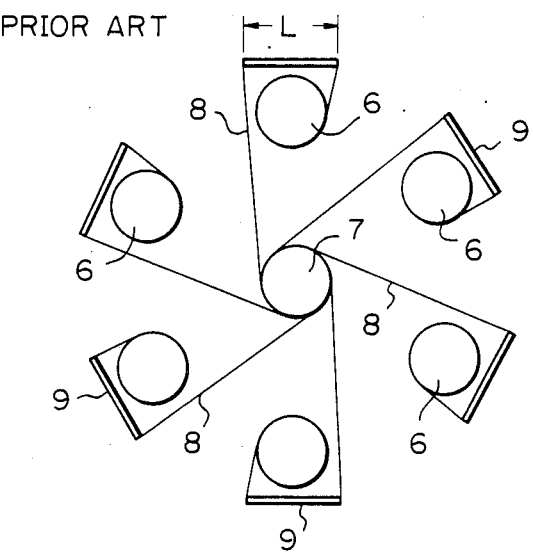
FIG. 2B is a side view showing a principle of the above annular-type tape driving apparatus.

As shown in FIG. 2A, the flat-type tape driving apparatus described in the above-mentioned Japanese Patent Application No. 124877/82 comprises a plurality of first rollers 6 arranged side by side and parrallel to each other in a single plane X, a plurality of guide plates 9 each arranged above the corresponding first roller 6, and a plurality of tapes 8 each of which is wound from its one end on the corresponding first roller 6 and passes on the corresponding guide plate 9 and which are wound together from the other ends thereof on a second roller 7 arranged parallel to the first rollers. Guide rollers 10 are provided for guiding the corresponding tapes 8. Similarly, as shown in FIG. 2B, in the annular-type tape driving apparatus described in the above-mentioned Japanese Patent Application No. 136538/82, the first rollers 6 are arranged around the second roller 7 and are disposed equidistantly from the second roller 7 and from each other. Each guide plate 9 is arranged over the radially outermost side of the corresponding first rollers 6. Each tape 8 which is wound from its one end on the corresponding first roller 6 passes on the corresponding guide plate 9 and extends to the second roller. The tapes 8 are wound together from the other ends thereof on the second roller 7. In these tape driving apparatuses, since "page" can be changed (that is to say, the items recorded on the tape portions positioned on the guide plates can be simultaneously changed) only by shifting all of the tapes 8 simultaneously by a distance equal to a width L (FIGS. 2A and 2B) of the guide plate, a desired item recorded on the tape can be quickly selected, in comparison with the conventional codeless input machine as shown in FIG. 1. However, in these apparatuses, since the guide plates 9 are provided for facilitating the handling operation of the items on the tapes, the whole construction of the apparatus is relatively complex and the apparatus itself is expensive.

Figure 3:
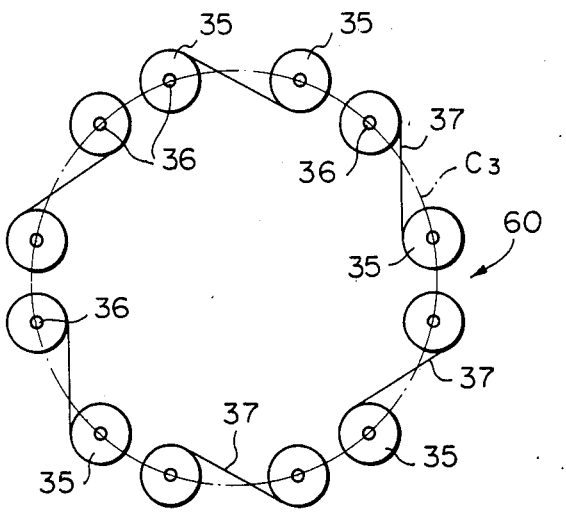

FIGS. 3–10 show an aspect of the present invention wherein the tapes are effectively used. In particular, FIG. 3 shows a flat-type tape driving apparatus 60 comprising a plurality of pairs of rollers 35. As shown, the central shafts 36 of these rollers 35 are positioned in a circle C3 and each roller in a pair is adjacent to the other. Each tape 37 is associated with one pair of rollers 35 and is wound on one of the paired rollers from its one end with a face D thereof inside and on the other roller from the other end thereof with the other face E thereof inside. Although not shown in the drawing, such pairs of rollers with the corresponding tapes can be arranged side by side to constitute the flat-type tape driving apparatus.

Figure 4:
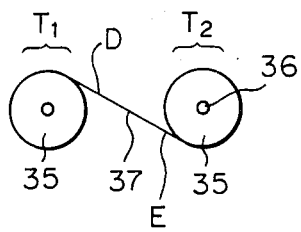
Figure 5:
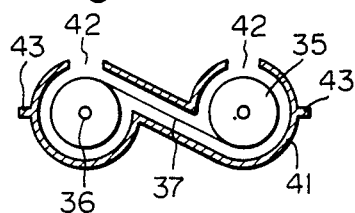
Figure 6:
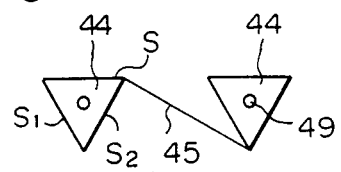

Referring now to FIG. 4, the tape portions T1 and T2 positioned on the upper portions of the rollers 35 are used for the inputting operation. Preferably, the pair of rollers 35 with the corresponding tape 37 are assembled as a cassette as shown in FIG. 5. The cassette includes a casing 41 for containing the paired rollers 35 and the associated tape 37. The casing 41 has longitudinal slits 42 to expose the upper portions of the paired rollers 35 for permitting the inputting operation regarding the upper tape portions in the casing 41. The casing 41 has ridges or keys 43 at its both sides. These keys are adapted to engage with corresponding keyways (not shown) of a frame of the apparatus so that the cassette can be assembled as the flat-type or annular-type tape driving apparatus.

Figure 7:
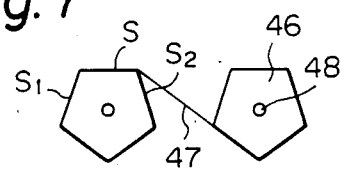

Of course, each of the paired rollers may have a polygonal cross section. For example, in the embodiment shown in FIG. 6, the cross section of each of the paired rollers 44 having central shafts 49 is an equilateral triangle. Also in this case, a tape 45 is wound on one of the paired rollers 44 from its one end with one face thereof inside and on the other roller from the other end thereof with the other face thereof inside. Similarly, the cross section of each of the paired rollers 46 having central shafts 48 may be a regular pentagon as shown in FIG. 7. Also in this case, a tape 47 is wound on one of the rollers 46 from its one end with one face thereof inside and on the other roller 46 from the other end thereof with the opposite face thereof inside. In the embodiment shown in FIG. 6, when the rollers 44 are rotated clockwise or anticlockwise by 120°, the tape 45 is shifted by a distance equal to the width of the rollers and the side surfaces of the rollers are changed from S to S1 or S2. Similarly, in the embodiment shown in FIG. 7, when the rollers 46 are rotated clockwise or anticlockwise by 72°, the tape 47 is shifted by a distance equal to the width of the side surface of the roller and the side surfaces of the rollers are changed from S to S1 or S2.

The operation of the tape driving apparatus applied to an input machine 59 will now be explained with reference to FIGS. 8, 9, and 10. An example of FIGS. 8 and 9 is the flat-type tape driving apparatus wherein four pairs of the pentagonal rollers 46 (each pair is the same as that of FIG. 7) are used. More particularly, as shown in FIG. 8, four pairs of the rollers 46 extend parallel to each other and are arranged side by side in such a way that all of the central shafts 48 of the rollers lie in a single plane. Of course, in each pair, the tape 47 is wound on one of the rollers from its one end with one face thereof inside and on the other roller from the other end thereof with the other face thereof inside. FIG. 9 shows an example of means for driving rollers. Said roller driving means comprises gears 51 and 52 fixed to the shafts 48 of the paired rollers 46, an endless toothed belt 53 engaged with all of the gears 51 and 52, and a stepping motor 54 connected to one of the gears 52 by a motor shaft 55. Between each shaft 48 of the roller 46 and the gear 51 or 52 a suitable clutch (not shown) is provided. If it is desired to shift all of the tapes 47 to the right (FIG. 9), the gears 51 are caused to be in freely rotatable condition by releasing the corresponding clutches and the gears 52 are positively rotated anticlockwise by the stepping motor 54 through the motor shaft 55 and the belt 53. On the other hand, if it is desired to shift all of the tapes to the left, the gears 52 are caused to be in freely rotatable condition and the gears 51 are positively rotated anticlockwise by the stepping motor 54 through the motor shaft 55, the idle gear 52 connected to the shaft 55 and the endless belt 53, thereby rotating the left side rollers of the paired rollers. By rotating the rollers 46 by 72°, the items displayed on the machine are changed to the next items (i.e., one page is changed). Inputting operation can be effected by designating one of the displayed items by finger-touch or pen-touch, as described in the above Japanese Patent Application No. 124877/82.

FIG. 10 shows another example of the roller driving means which can positively rotate all of the paired rollers. In this example, the roller driving means comprises a double-toothed endless belt 57. The upper run of the belt 57 is engaged by the gears 51 and 52 of the paired rollers (similar to those of FIG. 9) in staggered or zigzag fashion as shown in FIG. 10. The lower run of the belt 57 is not engage by the gears 51 and 52 and extends to a driving gear 56 fixed to a stepping motor (not shown). Guide gears 58 are provided for guiding the lower run of the belt. In this example, there are not clutches. When the belt 57 is moved in a clockwise direction by rotating the driving gear 56 clockwise, all of the tapes are simultaneously shifted to the right, and when the belt 57 is moved in an anticlockwise direction by rotating the driving gear anticlockwise, all of the tapes are simultaneously shifted to the left. Also in this case, by rotating the pentagonal rollers by 72°, the items displayed on the machine are changed to the next items.

As mentioned above, the tape driving apparatus according to the present invention can operate effectively even without the guide plates. Further, in the tape driving apparatus according to the present invention (FIGS. 3 to 10), since both faces D and E of the tape can be used for inputting operation and for recording information thereon, usefulness of the tape is doubled in comparison with that of the conventional one.

The tape driving apparatus of the present invention can be applied to various uses. For example, when magnetic tapes are used and one or more magnetic heads are provided adjacent to the tape holding rollers, the tape driving apparatus can be utilized as magnetic recording system such as tape-recorders. Of course, when a plurality of items is recorded on the tapes and a conventional input unit including a control portion and address memory is used, the tape driving apparatus can be utilized as multi-purpose codeless input equipment for computer addressers and telephone exchangers. It should be noted that the tape driving apparatus of the present invention can be utilized for other applications such as integrated information systems, data retrieval systems, data processing systems or the like.

This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. Apparatus for driving tape of the kind for recording information thereon, comprising
   (i) a first roller mounted to rotate about a first axis, the first roller having a plurality of flat faces forming a regular equilateral polygon on which the tape is wound,
   (ii) a second roller mounted to rotate about a second axis parallel to the first axis, the second roller having a plurality of flat faces forming a regular equilateral polygon that is congruent with the polygon of the first roller,
   (iii) an information recording tape extending between the first and second rollers without any intervening tape guide means, the tape having one end wound on the first roller with one face of the tape on the inside and the tape having its other end wound on the second roller with the opposite face of the tape on the inside, and
   (iv) drive means for causing the rollers to simultaneously rotate in opposite directions whereby upon rotation of the first and second rollers, corresponding flat faces of the polygons of those rollers are brought simultaneously into a plane that is parallel to the plane connecting the axes of the first and second rollers.

2. Apparatus according to claim 1, wherein the polygons of the first and second rollers are triangular polygons.

3. Apparatus for simultaneously driving a plurality of tapes of the kind for recording information theron, comprising
   (i) a set of first rollers, each roller being mounted to rotate about its own axis with all the axes of the first rollers being parallel and disposed in a common plane,
   (ii) a corresponding set of second rollers, each second roller being mounted to rotate about its own axis with all the axes of the second rollers being parallel and disposed in the common plane, the first and second rollers being disposed in an alternating sequence,
   (iii) a plurality of information recording tapes, each tape extending from a different one of the first rollers to the second roller which is next in the sequence with the tape having one end wound on that first roller with one face of the tape on the inside and the tape having its other end wound on the second roller with the opposite face of the tape on the inside, and
   (iv) drive means for causing the rollers in one set to rotate simultaneously in the same direction while enabling the other set of rollers to rotate in the opposite direction.

4. Apparatus according to claim 3, wherein each of the first and second rollers has a plurality of flat faces forming a regular equilateral polygon around which the tape is wound.

* * * * *